United States Patent [19]

Borse

[11] Patent Number: 5,035,771
[45] Date of Patent: * Jul. 30, 1991

[54] PROCESS FOR TREATING DIAMOND GRAINS

[75] Inventor: Dietrich Borse, Hamburg, Fed. Rep. of Germany

[73] Assignee: Ernst Winter & Sohn GmbH & Co., Hamburg, Fed. Rep. of Germany

[*] Notice: The portion of the term of this patent subsequent to Feb. 21, 2006 has been disclaimed.

[21] Appl. No.: 79,836

[22] Filed: Jul. 30, 1987

[30] Foreign Application Priority Data

Jul. 30, 1986 [DE] Fed. Rep. of Germany ....... 3625743

[51] Int. Cl.$^5$ .................. B24D 3/02; B24D 17/00; B24D 18/00
[52] U.S. Cl. .................................. 156/646; 156/644; 156/DIG. 68; 51/293; 51/296; 51/309
[58] Field of Search ............... 156/644, 656, 655, 646, 156/664, DIG. 68; 252/79.2; 51/293, 296, 309

[56] References Cited

U.S. PATENT DOCUMENTS

| | | | |
|---|---|---|---|
| 3,957,461 | 5/1976 | Lindstrom et al. | 51/295 |
| 4,247,305 | 1/1981 | Daniels et al. | 51/307 |
| 4,738,689 | 4/1988 | Gigl et al. | 51/293 X |
| 4,805,586 | 2/1989 | Borse | 125/11 R |

OTHER PUBLICATIONS

R. M. German, Powder Metallurgy Science, M.P.I.F., pp. 188–193, 1984.

Primary Examiner—David A. Simmons
Assistant Examiner—Thi Dang
Attorney, Agent, or Firm—Michael J. Striker

[57] ABSTRACT

Diamond grains utilized in cutting tools and usually held in a bond, specifically metallic bond are subjected to a pretreatment which enlarges their surface to at least twice their natural surface area. The pretreatment includes embedding the diamond grains in a metal powder, and exposing the embedded grains to a stream of hydrogen or hydrogen-containing gas at a temperature above 700° C. until pores are etched in contact areas of the diamonds with the metal particles. The pretreated diamond grains are then purified with an acid to remove the metal particles and other residues.

7 Claims, 1 Drawing Sheet

PROCESS FOR TREATING DIAMOND GRAINS

BACKGROUND OF THE INVENTION

The present invention relates to a process of treating diamond grains which are used for diamond tools.

In the use of diamond grains, for example for the production of diamond tools such as grinding wheels, dressing or trueing tools for grinding wheels or other diamond application industries such as jewelry or tracing needles provided with diamond, it has been of special importance that diamond grains be sufficiently firmly held in a bonding material in which the grains are embedded.

Bonding materials utilized in diamond tools are metals, metal alloys, glass, ceramics or synthetic resin. Most of these bonding materials are not adhesive to the surface of diamond grains, or adhesive forces are relatively small. Thus, in most cases, the diamond grains are only enveloped by the bonding material. This applies especially to metallic bonds. The exceptions are those metal alloys which contain at least one component which tends to react chemically with the diamond surface or to diffuse into the diamond surface. In the case of such reactive metallic bonding materials, the diamond surface is attacked to a greater or lesser degree, and a part of the diamond carbon is removed by the metal. The resulting roughness produced on the diamond surface can admittedly contribute to an improvement in the anchorage of the diamond grain in the bond. The bonding of the diamond grains into the metallic bond, where such a reaction takes place, occurs at an elevated temperature which is above 900° C. During the subsequent cooling, after the diamond bond has been produced, however, the carbon dissolved or absorbed by the metal is almost always again deposited at the interface between the diamond and the metallic bond, and this deposited carbon has no significant strength. This can be a graphite layer, or a layer of amorphous carbon or brittle carbide. No effective improvement in the adhesive bond is therefore achieved in this way at the interface between the diamond grain and the bond. The deposited carbon layer can even represent a weakening of the bond between the bonding metal and the diamond grains.

It is known that diamond grains are attacked and roughened if they are surrounded by a metal powder matrix in the sintering process, and metal powders utilized consist of iron or cobalt or of alloys of these metals. Incipient etching of diamond surfaces is detectable when the sintered alloys are processed in the range between 950° C. and 1150° C.

In another known process, diamond grains are heated while freely exposed in an oven, the atmosphere of which consists of oxygen or an oxygen-containing gas such as air, for example. In this case, diamond grains are attacked even at about 600° C. and higher. This is thus a slowed-down combustion of the diamond carbon to carbon monoxide CO, the diamond material being removed from the diamond surface, and small etching pits also being formed.

A similar incipient etching of diamond surfaces can be obtained, for example, by treating diamond grains in a melt of potassium nitrate $KNO_3$ at a temperature of 500° C. and higher.

None of the abovementioned etching processes or roughening processes give fully satisfactory results. On the one hand, this is caused by the reaction temperatures of more than 900° C., where not only the surface of the diamond is attacked, but the internal strength of the crystal is also reduced. This applies particularly to synthetic diamond grains which, in the normal case, still contain traces of the catalyst metal used for their preparation. At temperatures above 900° C., these catalyst residues lead to regraphitization of the diamonds or even to a partial disintegration of the crystal due to the relatively large thermal expansion of these metal residues as compared with that of diamond material.

On the other hand, the essential disadvantage of the known processes is that a relatively large quantity of material must be removed from the diamond crystals before the surface shows a satisfactory roughness, since these roughening or etching processes are surface-wearing processes which do not progress parallel to the surface. This undesired, relatively large removal of material from diamond crystals manifests itself by the fact that, for roughening a diamond grain of about 500 $\mu$m grain size, a weight loss of 10% must be accepted, and this already means a considerable loss in value. Various known roughening processes even cause weight losses of about 30%.

SUMMARY OF THE INVENTION

It is an object of the present invention to provide an improved process for treating diamond grains.

It is other object of this invention to provide a roughening process which can be carried out at a temperature below 900° C. and leads to a weight loss of diamond not exceeding a maximum of 5% and creates a surface topography which is defined by numerous very small holes, the depth of which is in most cases greater than their diameter. The surfaces obtained thus show numerous etching pits and channels, which are of a very inhomogeneous shape and contain as many undercuts as possible, so that penetrating bonding material encounters ideal scope for anchorage, in order to ensure improved adhesion of the diamond grains in the bond.

These and other objects of the invention are attained by a process for treating diamond grains, comprising the steps of embedding or enclosing the grains in a metal powder and exposing the embedded grains, to a stream of hydrogen or a hydrogen-containing gas at a temperature above 700° C. whereby pores are etched in surface areas of contact of each grain with the metal particles. Consequently, the areas surface are roughened and enlarged at least twice the original surface area of the grains.

The diamond grains may be subjected to cleaning with an acid after the roughening or etching step. The purpose of the cleaning process is to remove the metal powder from the roughened surface.

The metal powder in which the grains are embedded may be of iron, cobalt, nickel, their mixtures or their alloys.

The particle size of the metal powder may be less than 20 $\mu$m, preferably between 0.5 and 5 $\mu$m.

The diamond grains treated may be natural diamonds or synthetic diamonds of the size range from 20 $\mu$m to 5,000 $\mu$m.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
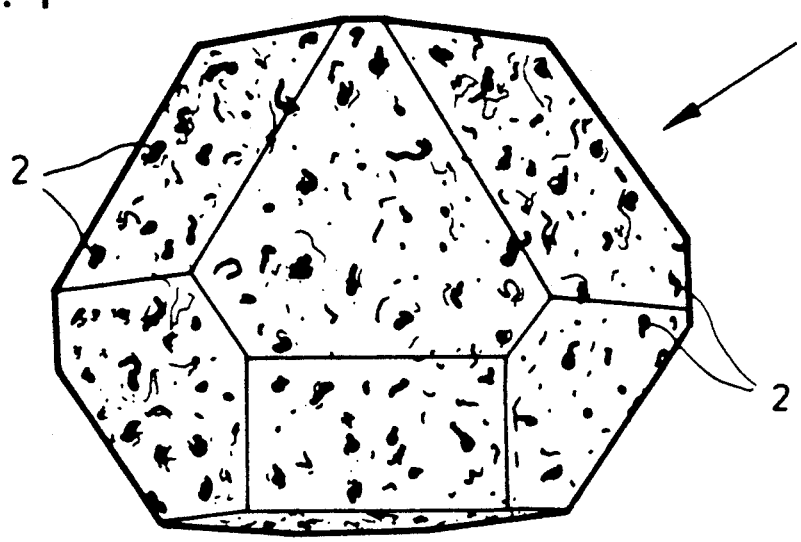
FIG. 1 shows a diamond grain, magnified 100 times.
Figure 2:
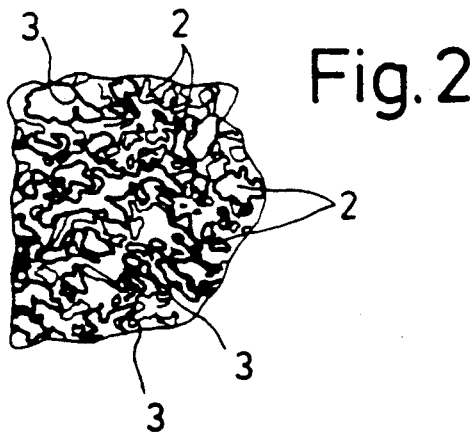
FIG. 2 shows a surface detail of a roughened diamond grain, magnified 500 times.
Figure 3:
FIG. 3 shows a part detail of the surface of a diamond grain, magnified 5,000 times.
Figure 4:
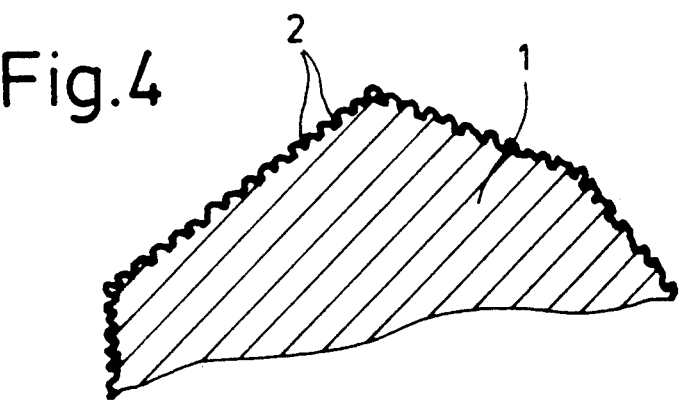
FIG. 4 shows a part cross-section through a diamond grain.

Referring now to the drawings in detail, the diamond grain 1 shown is a synthetic diamond in the form of a cubic octahedron with regularly arranged faces. These faces are artificially enlarged to a multiple of the original natural surface area by the treatment of the diamond grain in a metal powder at a temperature of 850° C. in an oven, in which the diamond grain is exposed to the action of hydrogen. As a result of this treatment, the diamond grain 1 is interposed by pores 2 which have undercuts, so that the bonding agent for the diamond grain is able to penetrate in a root-like fashion into the grain, and the area for adhesion is substantially enlarged.

A final unambiguous explanation of the kinetics of this process cannot yet be given. Numerous variants of carrying out the process suggest, however, that the diamond carbon initially diffuses into the metal particles which are in contact with the diamond surface. On the other hand, the metal activates the hydrogen, so that the latter is bonded to the carbon dissolved in the metal to give methane $CH_4$ and flushes away this gas. As a result, metal particles which take part in the reaction remain receptive for further carbon which diffuses at the point of contact of the diamond and the metal. Carbon saturation in the metal particles does not arise and the metal thus acts like a catalyst. In this way, the metal particles eat pointwise into the diamond surface and produce the desired porous topography.

The diamond grains pretreated according to the invention can be bonded with particular advantage by electroplated metals. It was possible to prolong the life of diamond tools produced in this way by more than 100%.

Even metals, which are applied to diamond grains by the so-called coating process, such as, for example, phosphorus-containing nickel or phosphorus-containing cobalt or copper, can very well be anchored in diamond surfaces pretreated in this way, so that the subsequent bonding into other bonding materials, such as metals or synthetic resins, is substantially improved.

Liquid metals containing additives which activate wetting, such as, for example, copper/silver alloys with added titanium, can also penetrate readily into the indentations in the diamond surfaces thus treated and thus produce an excellent adhesive bond.

Moreover, glass-ceramic bonding materials can be used which normally contain a glass component of low surface tension, which melts on processing.

The etching process according to the invention can be applied to natural diamonds. It is particularly suitable, however, for the treatment of synthetic diamonds.

Natural diamond grains have as a rule an irregular surface, if they are grains which have been produced by crushing of larger diamonds. The fracture surfaces of such diamond grains already allow a partial anchorage in the bonding material. The anchorage and adhesion in the bonding material can be substantially improved further by additional roughening according to the present invention.

Synthetic diamonds as a rule have crystal faces, some of which are also plane-parallel. The more homogeneously a synthetic diamond has grown, the more regular is its geometrical form, in most cases in the shape of a cubic octahedron. Diamond crystals of particularly homogeneous growth have in most cases also a high degree of purity and a high strength. However, these positive features can be fully exploited only if the crystals are firmly and permanently held by the bonding material. However, the plane faces of well-grown crystals entail poor anchorage on bonding. The economic benefit of such synthetic diamond crystals can therefore be considerably increased by high-grade roughening according to the present invention. This has clearly manifested itself in the case of dressing tools for grinding wheels, where the diamond crystals are enclosed in an electro-deposited metal bond of nickel. The same applies to diamond crystals which have been embedded in a metal powder matrix which had been impregnated with a diamond-wetting molten alloy. Such an alloy consists, for example, of silver and copper and contains added titanium.

The execution of the etching process according to the invention is as follows:

Diamond crystals are loosely embedded or inserted in a fine metal powder, the particle sizes of which are below 20 $\mu$m, preferably between 5 $\mu$m and 0.5 $\mu$m. The metal particles do not form a coherent coating or a compact layer, but sinter loosely together and contact the surface of the diamond grains at many discrete points while leaving minute gaps therebetween. The container used can be a porcelain combustion boat, but other forms of a container are also suitable, provided that the containers can be flushed by gas. The container is placed into an oven which can be flushed by gas, preferably a tubular oven. Hydrogen or a mixed, hydrogen-containing gas is passed through the oven. Pure hydrogen of a degree of purity of at least 99% $H_2$ has proved best. Suitable metal powders are iron, cobalt, nickel or mixtures or alloys of these metals. This special heat treatment leads to the before described roughening of the surface areas of the diamond crystals, if the temperature is at least 700° C. Higher temperatures intensify the roughening. However, temperatures above 900° C. are disadvantageous, because the internal strength of the diamond crystals is then reduced. In most cases, 30 minutes suffice for this treatment in the temperature range from 700° C. to 900° C. However, the reaction time can be varied within wide ranges.

After the special heat treatment, the roughened diamond crystals are cleaned by dissolving the metal powder with acid, for example with nitric acid and hydrochloric acid. Then the diamonds are washed with pure water until their surfaces are free of meal and other possible residues, and dried. This gives the roughened and purified diamonds which can then be processed further.

It will be understood that each of the elements described above, or two or more together, may also find a useful application in other types of methods for the treatment of diamond grains differing from the types described above.

While the invention has been illustrated and described as embodied in a process for treating diamond grains, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of roughening surfaces of diamond grains, comprising the steps of embedding the diamond grains in a metal powder having a particle size less than 20 μm and of a material selected from a group consisting of iron, cobalt, nickel, a mixture thereof, and alloys thereof; exposing the embedded diamond grains to a stream of one of hydrogen and hydrogen-containing gas at a temperature above 700° C. until pores are etched in surface areas of the diamond grains which are in contact with particles of the metal powder, the diamond grains being exposed to said stream until their surface areas are at least twice as large as a size of their original surface areas; and removing the metal powder and other residuals from etched diamond grains.

2. A method as defined in claim 1, wherein said exposing step includes exposing the diamond grains to a reaction temperature of 700°–900° C.

3. A method as defined in claim 2, wherein said embedding step includes embedding the diamond grains in a powder material having a particle size between 0.5 and 5 μm.

4. A method as defined in claim 1, wherein said removing step comprises the step of cleaning the etched diamond grains with an acid.

5. A diamond tool, comprising at least one diamond grain having a surface portion roughened by embedding the diamond grain in a metal powder having a particle size less than 20 μm and of a material selected from a group consisting of iron, cobalt, nickel, a mixture thereof, and alloys thereof; exposing the embedded diamond grain to a stream of one of hydrogen and hydrogen-containing gas at a temperature above 700° C. until pores are etched in surface areas of the diamond grain which are in contact with particles of the metal powder, said diamond grain being exposed to the stream until its surface areas are at least twice as large as a size of its original surface areas; and removing the metal powder and other residuals from the etched diamond grains.

6. A diamond tool as defined in claim 5, wherein said roughened surface portion is anchored in a bonding material.

7. A diamond tool as defined in claim 6 wherein said bonding material is a metal applied on said roughened surface portion by an electroplating process.

* * * * *